US009630362B2

(12) United States Patent
Ventolina Cordero et al.

(10) Patent No.: US 9,630,362 B2
(45) Date of Patent: Apr. 25, 2017

(54) PRINTING HEAD MODULE

(71) Applicants: XYZprinting, Inc., New Taipei (TW); Kinpo Electronics, Inc., New Taipei (TW); Cal-Comp Electronics & Communications Company Limited, New Taipei (TW)

(72) Inventors: Clyde Ventolina Cordero, Singapore (SG); Cher-Lek Toh, Singapore (SG); Wei-De Toh, Singapore (SG); Shy-Huey Yee, Singapore (SG)

(73) Assignees: XYZprinting, Inc., New Taipei (TW); Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 73 days.

(21) Appl. No.: 14/287,197

(22) Filed: May 27, 2014

(65) Prior Publication Data

US 2015/0328837 A1  Nov. 19, 2015

(30) Foreign Application Priority Data

May 16, 2014  (TW) .............................. 103117365 A

(51) Int. Cl.
*B29C 67/00* (2017.01)
*B33Y 30/00* (2015.01)
*B29L 9/00* (2006.01)

(52) U.S. Cl.
CPC ...... *B29C 67/0055* (2013.01); *B29C 67/0085* (2013.01); *B29L 2009/00* (2013.01); *B33Y 30/00* (2014.12)

(58) Field of Classification Search
None
See application file for complete search history.

(56) References Cited

U.S. PATENT DOCUMENTS

| 8,512,024 B2 | 8/2013 | Pax | |
|---|---|---|---|
| 2013/0126289 A1* | 5/2013 | Vicente et al. | 192/45.1 |
| 2015/0037446 A1* | 2/2015 | Douglass et al. | 425/131.1 |

FOREIGN PATENT DOCUMENTS

| CN | 101460050 | 6/2009 |
|---|---|---|
| CN | 101778704 | 7/2010 |

(Continued)

OTHER PUBLICATIONS

"First Office Action of China Counterpart Application", issued on Dec. 19, 2016, p. 1-p. 6, in which the listed references were cited.

*Primary Examiner* — Jacob Thomas Minskey
(74) *Attorney, Agent, or Firm* — Jianq Chyun IP Office

(57) ABSTRACT

A printing head module includes a driving gear, a bi-directional motor, a first feeding module and a second feeding module. The bi-directional motor selectively drives the driving gear to rotate along a first direction and a second direction. The first feeding module disposed at a first side of the driving gear includes a first unidirectional gear and a first idler gear. The driving gear is engaged with the first unidirectional gear, and the first unidirectional gear unidirectionally drives the first idler gear to rotate. The second feeding module is disposed at a second side of the driving gear opposite to the first side, and includes a second unidirectional gear and a second idler gear, the driving gear is engaged with the second unidirectional gear to drive the second unidirectional gear to rotate, and the second unidirectional gear unidirectionally drive the second idler gear to rotate.

9 Claims, 7 Drawing Sheets

(56) References Cited

FOREIGN PATENT DOCUMENTS

| | | |
|---|---|---|
| CN | 102922745 | 2/2013 |
| CN | 103129165 | 6/2013 |

* cited by examiner

PRINTING HEAD MODULE

CROSS-REFERENCE TO RELATED APPLICATION

This application claims the priority benefit of Taiwan application serial no. 103117365, filed on May 16, 2014. The entirety of the above-mentioned patent application is hereby incorporated by reference herein and made a part of this specification.

BACKGROUND OF THE INVENTION

Technical Field

The invention relates to a printing head module, and more particularly, to a printing head module adapted for a three-dimensional (3-D) printing apparatus.

Description of Related Art

With the advance in computer-aided manufacturing (CAM), rapid prototyping (RP) has been developed by manufacturing industries, which can rapidly fabricate original concept designs. The RP technology may provide geometric shapes with limitations, and excellence of the RP technology is better demonstrated in more complex components. Further, manpower and processing time can be greatly reduced, and designed components on 3-D computer-aided design (CAD) can be realistically rendered in a short amount of time. Not only can the components be touched, but the geometric curves thereof can also be truly appreciated. Moreover, the assembly ability of the components can be tested, and even functional tests may be performed thereto.

A number of RP methods are available, such as fused deposition modeling (FDM) and laminated object manufacturing (LOM) and so on.

However, in most 3-D printing apparatuses that currently use the RP methods for forming 3-D objects, only one printing head is provided. As a result, when it is necessary to switch to a different construction material, the printing head needs to be ejected first so as to eject the current material, followed by connecting a desired construction material to the printing head, and then returning the printing head that completes the replacement of the material to its original position in order to resume printing. This is very inconvenient in use. Therefore, the industry has begun to develop printing head modules equipped with multiple printing heads. However, this kind of printing head module with multiple printing heads require multiple corresponding driving motors for separately driving a feeding gear set of each of the printing heads, which not only considerably increases the component complexity of the 3-D printing apparatus but also the production cost thereof.

SUMMARY OF THE INVENTION

The invention provides a printing head module which utilizes a single motor for driving a plurality of feeding gear sets to perform feeding operations individually.

The printing head module according to the invention is adapted to apply a first modeling material and a second modeling material layer by layer onto a base, so as to form a three-dimensional (3-D) object. The printing head module includes a driving gear, a bi-directional motor, a first feeding module and a second feeding module. The first feeding module is disposed at a first side of the driving gear and includes a first unidirectional gear and a first idler gear. The first unidirectional gear is engaged with the driving gear, and the first unidirectional gear unidirectionally drives the first idler gear to rotate. The second feeding module is disposed at a second side of the driving gear opposite to the first side, and includes a second unidirectional gear and a second idler gear. The driving gear is engaged with the second unidirectional gear to drive the second unidirectional gear to rotate, and the second unidirectional gear unidirectionally drives the second idler gear to rotate. The bi-directional motor is connected to the driving gear to selectively drive the driving gear to rotate along a first direction and a second direction. When the driving gear is driven to rotate along the first direction, the first unidirectional gear does not drive the first idler gear to rotate, and the second unidirectional gear drives the second idler gear to rotate, so the second unidirectional gear and the second idler gear drive the second modeling material to move. When the driving gear is driven to rotate along the second direction, the first unidirectional gear drives the first idler gear to rotate, so the first unidirectional gear and the first idler gear drive the first modeling material to move, and the second unidirectional gear does not drive the second idler gear to rotate.

Based on the above, the invention utilizes the driving motor and the driving gear for driving the first and the second unidirectional gears to perform bi-directional rotation, wherein the first unidirectional gear is only capable of unidirectionally driving the first idler gear to rotate, and the second unidirectional gear is only capable of unidirectionally driving the second idler gear to rotate. Moreover, the rotating directions of the driven first idler gear and second idler gear are opposite to each other. According to such arrangement, by means of a single driving motor and a single driving gear, the invention is capable of separately driving two different feeding gear sets for performing feeding operations, which not only simplifies the component complexity of the printing head module but also decreases the production cost thereof.

To make the above features and advantages of the invention more comprehensible, embodiments accompanied with drawings are described in detail as follows.

DETAILED DESCRIPTION OF DISCLOSED EMBODIMENTS

It is to be understood that both the foregoing and other detailed descriptions, features, and advantages are intended to be described more comprehensively by providing embodiments accompanied with drawings hereinafter. In the following embodiments, wordings used to indicate directions, such as "up," "down," "front," "back," "left," and "right", merely refer to directions in the accompanying drawings. Therefore, the directional wording is used to illustrate rather than limit the invention. In addition, in the following embodiments, the same or like numbers stand for the same or like elements.

Figure 1:
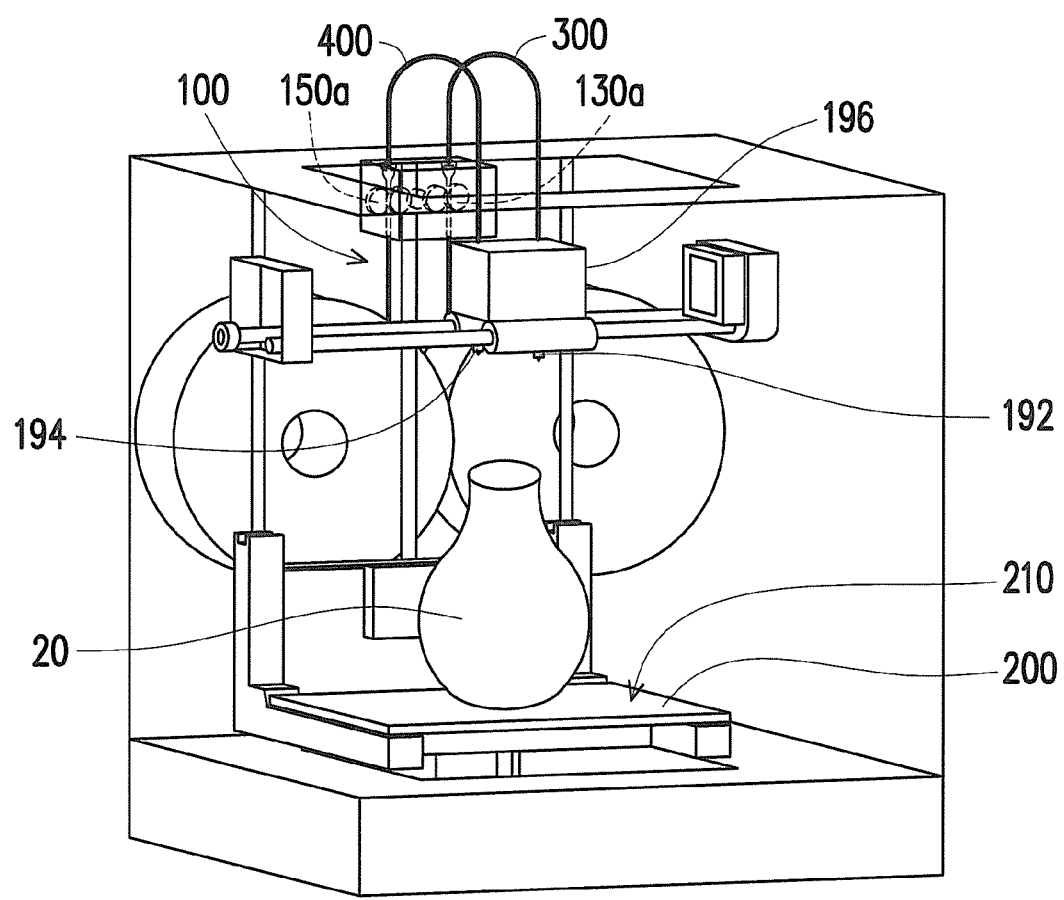
FIG. 1 is a schematic view of application of a printing head module to a 3-D printing apparatus according to an embodiment of the invention.

FIG. 1 is a schematic view of application of a printing head module to a 3-D printing apparatus according to an embodiment of the invention. Referring to FIG. 1, a printing head module 100 of the present embodiment is adapted to be applied to a 3-D printing apparatus 10. The 3-D printing apparatus 10, for example, prints out a 3-D object 20 according to a digital 3-D model. The 3-D printing apparatus 10 includes the printing head module 100 of the present embodiment and a base 200. As shown in FIG. 1, the base 200 has a carrying surface 210 that is configured to carry a first modeling material 300 and a second modeling material 400 provided by the printing head module 100. The printing head module 100 is arranged to slide back and forth parallel to the carrying surface 210, and the base 200 may, for example, be parallel to and move relative to the printing head module 100.

In detail, the 3-D printing apparatus 10 further includes a control unit coupled to the printing head module 100 for reading and processing the digital 3-D model. The digital 3-D model may be a digital 3-D image file constructed by, for example, a computer main unit by use of computer-aided design (CAD) or animation modeling software, etc. The control unit controls the printing head module 100 to move based on the digital 3-D model. During the moving, the printing head module 100 dispenses the first modeling material 300 and/or the second modeling material 400 layer by layer on the base 200, thereby stacking to form the 3-D object 20.

Figure 2:
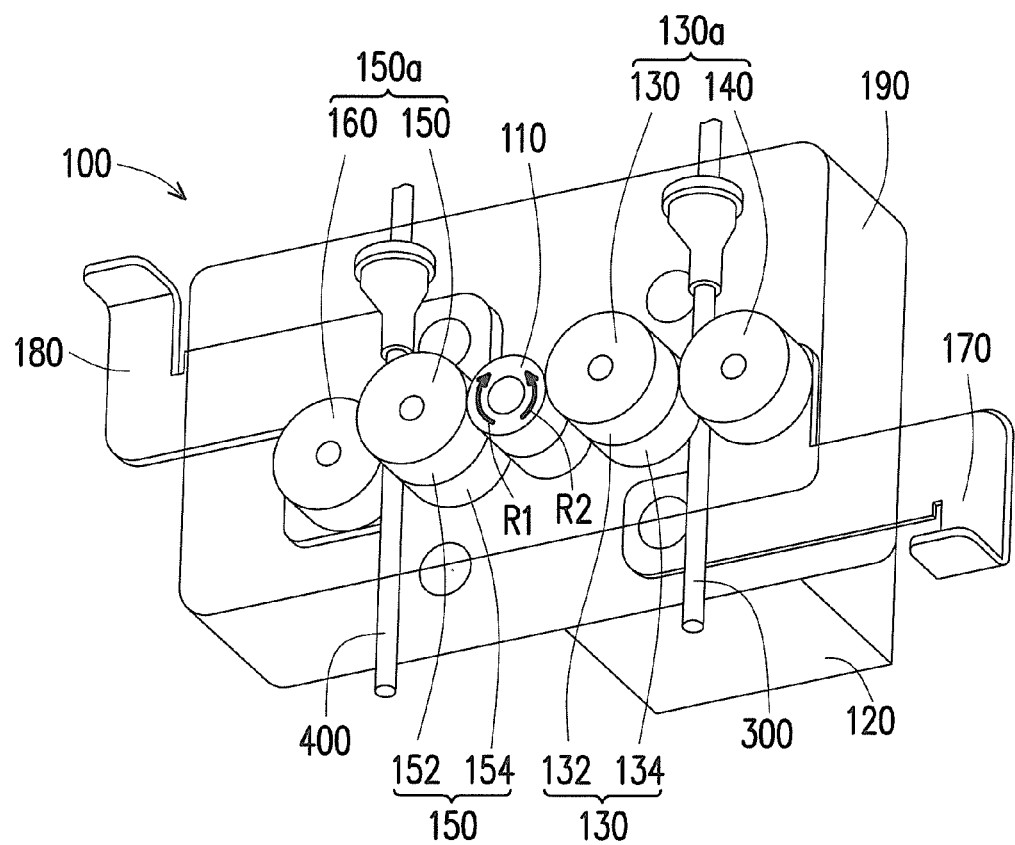
FIG. 2 is a schematic view of a printing head module according to an embodiment of the invention.

FIG. 2 is a schematic view of a printing head module according to an embodiment of the invention. It is to be noted that, to clearly present the inner structure of the printing head module 100, a housing 190 of the printing head module 100 in FIG. 2 is illustrated in a perspective manner. Referring to FIG. 2, in the present embodiment, the printing head module 100 includes a driving gear 110, a bi-directional motor 120, a first feeding module 130a and a second feeding module 150a. The bi-directional motor 120 is connected to the driving gear 110 to selectively drive the driving gear 110 to rotate along a first direction R1 and a second direction R2. In the present embodiment, the first direction R1 is a clockwise direction, as shown in FIG. 2, while the second direction R2 is a counterclockwise direction. Of course, the present embodiment is merely for exemplary purposes, and the disclosure is not limited thereto. The first feeding module 130a is disposed at a first side of the driving gear 110, and the first feeding module 130a includes a first unidirectional gear 130 and a first idler gear 140. The second feeding module 150a is disposed at a second side of the driving gear 110, and the second feeding module 150a includes a second unidirectional gear 150 and a second idler gear 160. The first unidirectional gear 130 is engaged with the driving gear 110 so as to be driven to rotate by the driving gear 110. The first unidirectional gear 130 unidirectionally drives the first idler gear 140 to rotate. The second unidirectional gear 150 is engaged with the driving gear 110 so as to be driven to rotate by the driving gear 110. The second unidirectional gear 150 unidirectionally drives the second idler gear 160 to rotate.

In the present embodiment, the printing head module 100 further includes a printing head 196 as shown in FIG. 1. The printing head 196 is separated from the first feeding module 130a and the second feeding module 150a, but, of course, the present disclosure is not limited thereto. In other embodiment, the printing head 196, the first feeding module 130a and the second feeding module 150a may also be disposed in the housing 190 together. The first feeding module 130a and the second feeding module 150a are configured to respectively transmit the first modeling material 300 and the second modeling material 400 to the printing head 196 for dispensing the first modeling material 300 and/or the second modeling material 400 layer by layer on the base 200 to form the 3-D object 20. In detail, the printing head 196 further includes a first heating nozzle 192 and a second heating nozzle 194. The first modeling material 300 and the second modeling material 400 are both hot-melt materials. Accordingly, the first unidirectional gear 130 and the first idler gear 140 collectively nip the first modeling material 300 and transmit the first modeling material 300 to the first heating nozzle 192, so that the first modeling material 300 is melted and extruded from the first heating nozzle 192 to be formed on the base 200. Similarly, the second unidirectional gear 150 and the second idler gear 160 collectively nip the second modeling material 400 and transmit the second modeling material 400 to the second heating nozzle 194, so that the second modeling material 400 is melted and extruded from the second heating nozzle 194 to be formed on the base 200.

Figure 3:
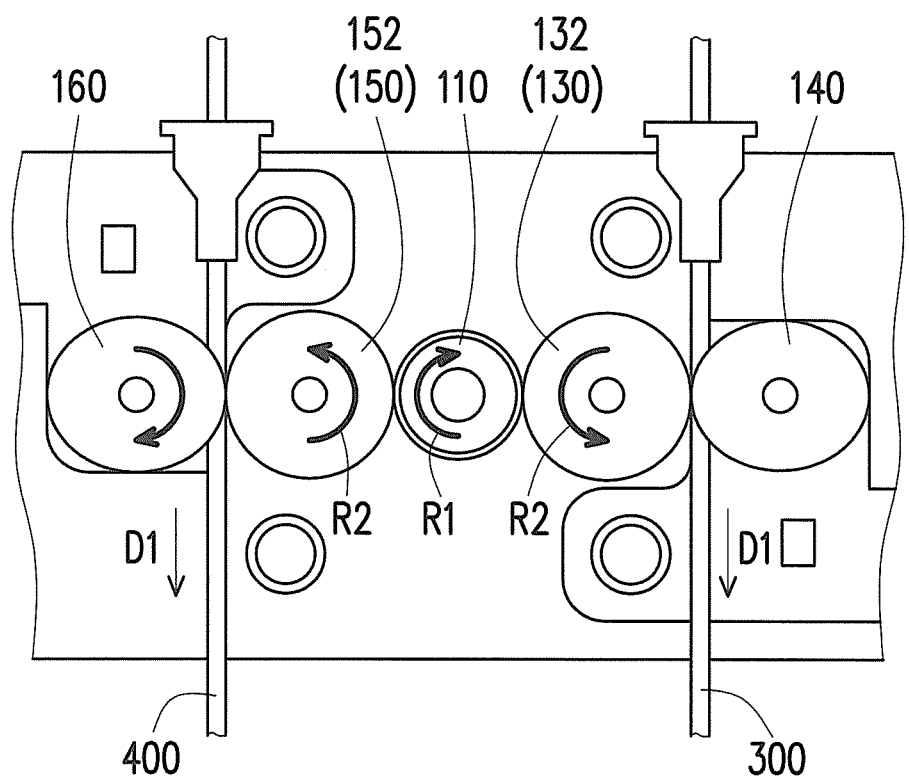
FIG. 3 is a partially enlarged schematic view of the printing head module in FIG. 2 in a first driving mode.
Figure 4:
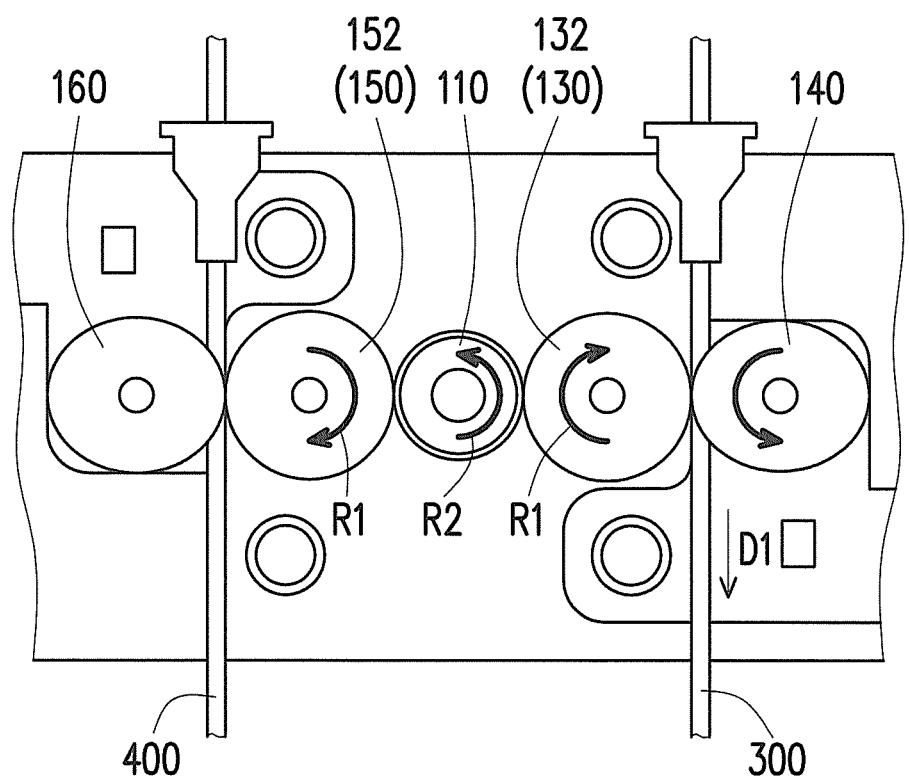
FIG. 4 is a partially enlarged schematic view of the printing head module in FIG. 2 in a second driving mode.

FIG. 3 is a partially enlarged schematic view of the printing head module in FIG. 2 in a first driving mode. FIG. 4 is a partially enlarged schematic view of the printing head module in FIG. 2 in a second driving mode. In detail, the printing head module 100 of the present embodiment includes the first driving mode as shown in FIG. 3, and the second driving mode as shown in FIG. 4. Referring to FIG. 3 and FIG. 4 together, when the driving gear 110 is driven to rotate along the second direction R2, as shown in FIG. 3, the first unidirectional gear 130 does not drive the first idler gear 140 to rotate, so as not to drive the first modeling material 300 to move. Meanwhile, the second unidirectional gear 150 drives the second idler gear 160 to rotate, and nip the second modeling material 400 collectively with the second idler gear 160, so as to drive the second modeling material 400 to move along a feeding direction D1. When the driving gear 110 is driven to rotate along the second direction R2, as shown in FIG. 4, the first unidirectional gear 130 drive the first idler gear 140 to rotate, and nip the first modeling material 300 together with the first idler gear 140, so as to collectively drive the first modeling material 300 to move along the feeding direction D1. Meanwhile, the second unidirectional gear 150 does not drive the second idler gear 160 to rotate. Hence, the second idler gear 160 and the second unidirectional gear 150 does not drive the second modeling material 400 to move.

Figure 5:
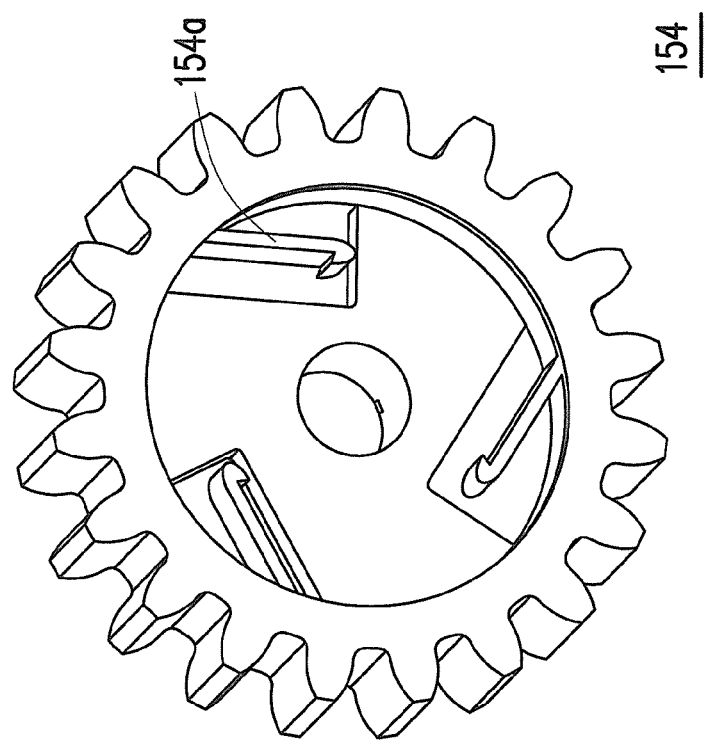
FIG. 5 is a schematic view of an active gear and a passive gear of a unidirectional gear according to an embodiment of the invention.
Figure 5:
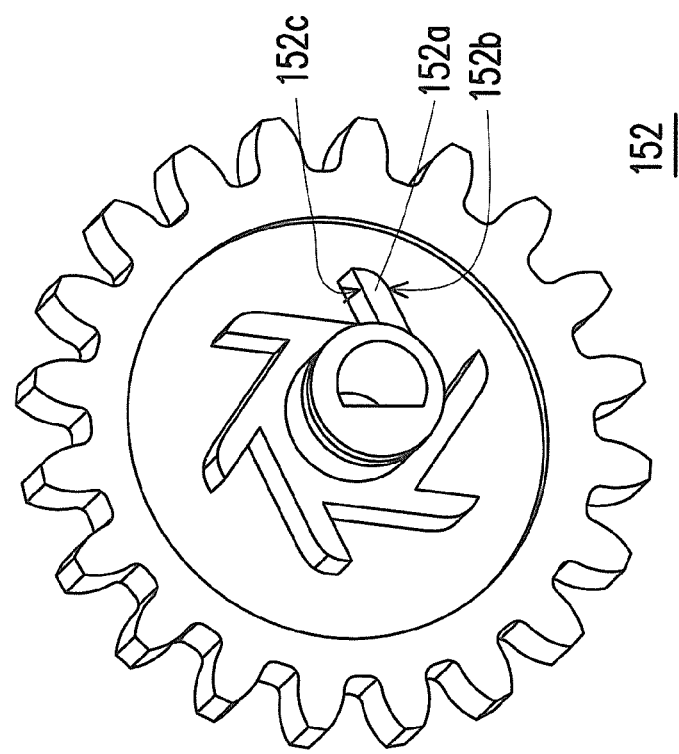
Figure 6:
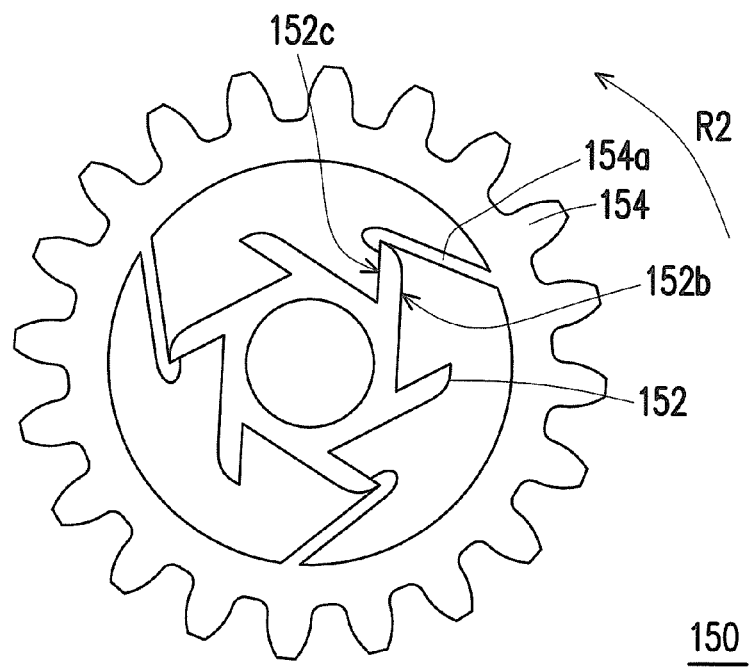
FIG. 6 is a cross-sectional view of the unidirectional gear in FIG. 5 when the active gear rotating in the second direction.
Figure 7:
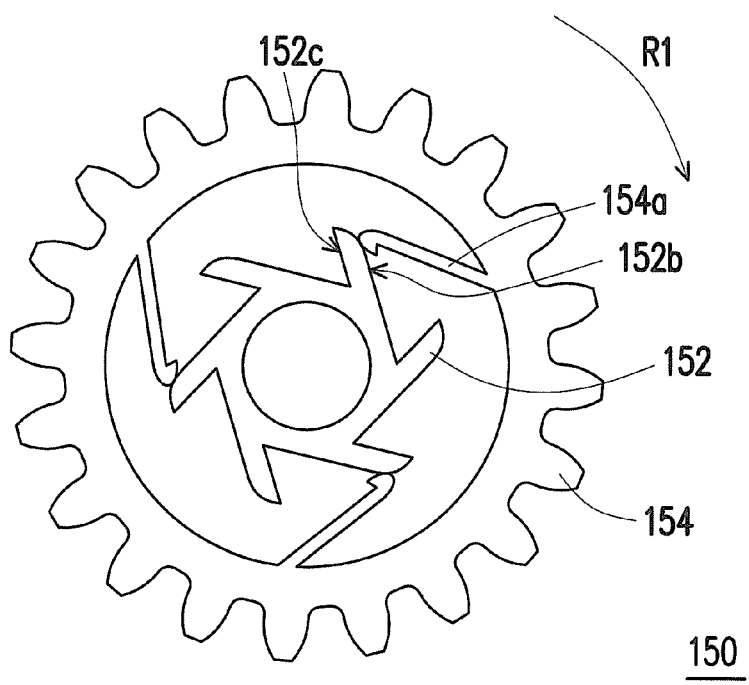
FIG. 7 is a cross-sectional view of the unidirectional gear in FIG. 5 when the active gear rotating in the first direction.

FIG. 5 is a schematic view of an active gear and a passive gear of a unidirectional gear according to an embodiment of the invention. FIG. 6 is a cross-sectional view of the unidirectional gear in FIG. 5 when the active gear rotating in the second direction. FIG. 7 is a cross-sectional view of the unidirectional gear in FIG. 5 when the active gear rotating in the first direction. Referring to FIG. 5 to FIG. 7, it is noted that the unidirectional gear shown in FIG. 5 to FIG. 7 may be the first unidirectional gear 130 and/or the second unidirectional gear 150. In the present embodiment, FIG. 5 to FIG. 7 illustrates, for example, the second unidirectional gear 150 as shown in FIG. 2, but the disclosure is not limited thereto. In the present embodiment, the second unidirectional gear 150 includes a second active gear 152 and a second passive gear 154. The second active gear 152 is engaged with the driving gear 110, and the second passive gear 154 is engaged with the second idler gear 160 as shown in FIG. 2. The second active gear 152 may includes a ratchet as shown in FIG. 5, which has a plurality of teeth 152a. Each of the teeth 152a has a curved side 152b and a straight side 152c. The second passive gear 154 includes at least a pawl 154a. With such arrangement, when the driving gear 110 drives the second active gear 152 to rotate along the second direction R2 as shown in FIG. 6, the straight side 152c of one of the teeth 152c of the second active gear 152 is engaged with the pawl 154a of the second passive gear 154, so as to drive the second passive gear 154 to rotate with the second active gear 152. Accordingly, the second active gear 152 and second passive gear 154 collectively drive the second modeling material 400 to move along the feeding direction D1 as shown in FIG. 3.

Likewise, when the driving gear 110 drives the second active gear 152 to rotate along the first direction R1, the pawl 154a of the first passive gear 154 passes along the curved side 152b of each of the teeth 152a of the first active gear 152, so as to release the engagement with the first passive gear 154. Hence, when the second active gear 152 is driven by the driving gear 110 to rotate along the first direction R1, the second passive gear 154 does not rotate with the second active gear 152. Thus, the second passive gear 154 and the second active gear 152 does not drive the second modeling material 400 to move as shown in FIG. 4.

Of course, the embodiments of FIG. 5 to FIG. 7 are only for exemplary purposes. The disclosure does not limit the design of the second active gear 152 and the second passive gear 154 as well as the design of the first active gear 132 and the first passive gear 134. As long as the unidirectional gears 130 and 150 are capable of unidirectionally driving the corresponding idler gears 140 and 160 to rotate, and the rotating directions of the idler gears 140, 160 are opposite to each other, such connection relationship falls within the scope of protection of the application.

Figure 8:
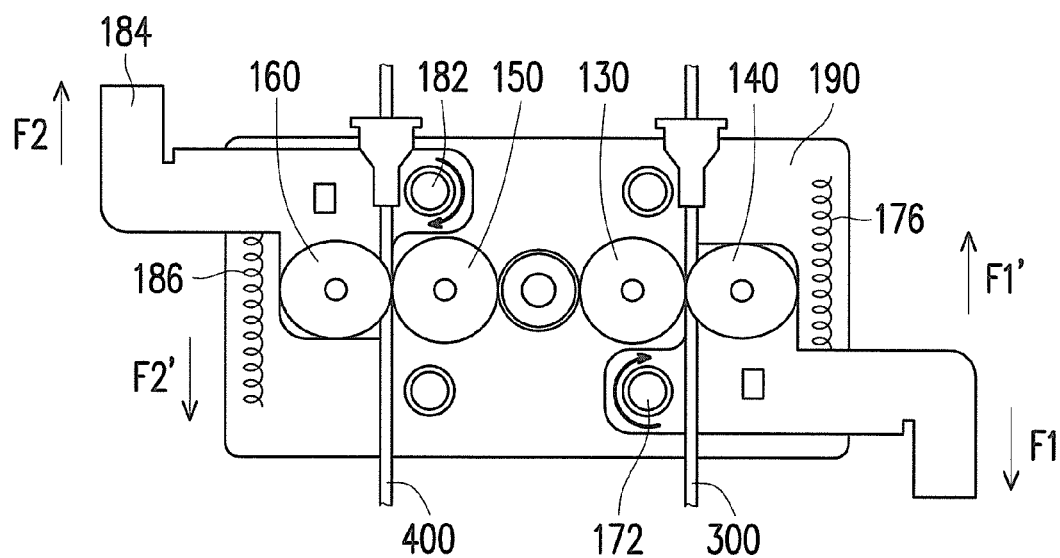
FIG. 8 and FIG. 9 are schematic views of the printing head module in FIG. 2 in a maintenance mode.
Figure 9:
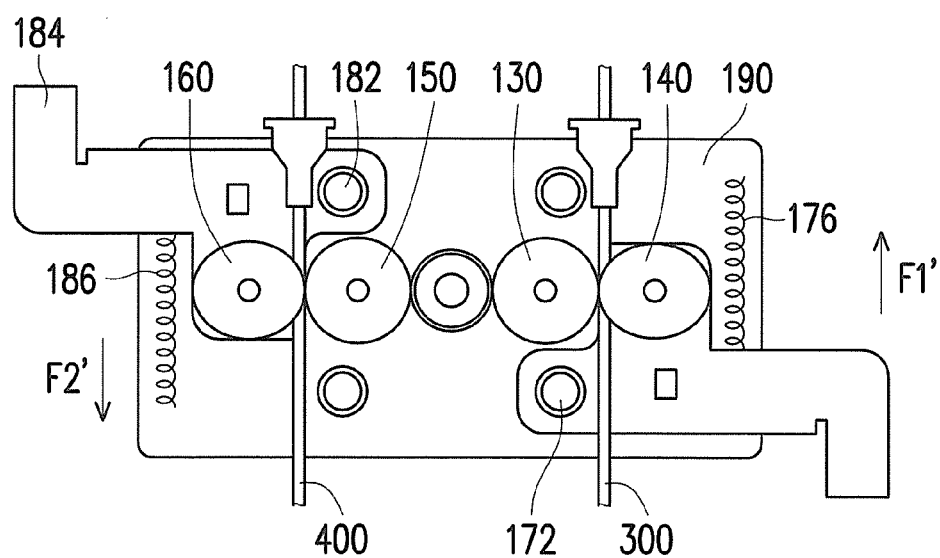

FIG. 8 and FIG. 9 are schematic views of the printing head module in FIG. 2 in a maintenance mode. Referring first to FIG. 8, in the present embodiment, the printing head module 100 further includes the housing 190, a first pivot arm 170, a first elastic element 176, a second pivot arm 180 and a second elastic element 186. The first pivot arm 170 includes a first pivot portion 172 and a first extension portion 174. The first pivot portion 172 is connected to the first extension portion 174, and is pivoted to the housing 190, as shown in FIG. 8. The first elastic element 176 is connected between the first pivot arm 170 and the housing 190. Similarly, the second pivot arm 180 includes a second pivot portion 182 and a second extension portion 184. The second pivot portion 182 is connected to the second extension portion 184, and is pivoted to the housing 190, as shown in FIG. 8. The second elastic element 186 is connected between the second pivot arm 180 and the housing 190. The first idler gear 140 is disposed on the first pivot arm 170, and the second idler gear 160 is disposed on the second pivot arm 180.

With to such arrangement, when the printing head module 100 is in a maintenance mode, for example, when a user intends to replace the first modeling material 300, the user may apply an external force F1 to the first extension portion 174, so as to cause the first pivot arm 170 to rotate relative to the housing 190, thereby driving the first idler gear 140 to move away from the first unidirectional gear 130, and further reducing a nipping force applied to the first modeling material 300 by the first unidirectional gear 130 and the first idler gear 140. In this way, the user may easily remove the first modeling material 300 to perform maintenance operations such as replacement of the material, removal of jammed material, etc. Likewise, when intending to replace the second modeling material 400, the user may apply an external force F2 to the second extension portion 184, so as to cause the second pivot arm 180 to rotate relative to the housing 190, thereby driving the second idler gear 160 to move away from the second unidirectional gear 150, and further reducing a nipping force applied to the second modeling material 400 by the second unidirectional gear 150 and the second idler gear 160. In this way, the user may easily remove the second modeling material 400 to perform the maintenance operations such as replacement of the material, removal of jammed material, etc.

Following the above, referring to FIG. 8 and FIG. 9 together, when the first extension portion 174 bears the external force F1 to rotate relative to the housing 190, the first elastic element 176 connected between the first pivot arm 170 and the housing 190 generates an elastic restoring force F1'. Accordingly, after the user removed the first modeling material 300 and released the first extension portion 174, the external force F1 applied to the first extension portion 174 disappears, the elastic restoring force F1' generated by the first elastic element 176 pulls the first pivot arm 170 to its original position, and the nipping force applied to the first modeling material 300 by the first unidirectional gear 130 and the first idler gear 140 is also recovered. Likewise, when the second extension portion 184 bears the external force F2 to rotate relative to the housing 190, the second elastic element 186 connected between the second pivot arm 180 and the housing 190 generates an elastic restoring force F2'. Accordingly, after the user removed the second modeling material 400 and released the second extension portion 184, the external force F2 applied to the second extension portion 184 disappears, the elastic recovery force F2' generated by the second elastic element 186 pulls the second pivot arm 180 to its original position, and the nipping force applied to the second modeling material 400 by the second unidirectional gear 150 and the second idler gear 160 is also recovered.

In summary, the invention utilizes a bi-directional driving motor and a driving gear for driving a first and a second unidirectional gears to perform bi-directional rotation, wherein the first unidirectional gear is only capable of unidirectionally driving a first idler gear to rotate, and the second unidirectional gear is only capable of unidirectionally driving a second idler gear to rotate. Moreover, the rotating directions of the driven first and second idler gears are opposite to each other. According to such arrangement, by means of the single driving motor and the single driving gear, the invention is capable of separately driving two different feeding gear sets for performing feeding operations, which not only simplifies the component complexity of the printing head module but also decreases the production cost thereof.

In addition, the invention further has the idler gear disposed on a pivot arm, and the pivot arm is adapted to pivot relative to a housing. Thus, when a user intends to replace a modeling material, the user may apply an external force to the pivot arm to cause the pivot arm to pivot relative to the housing. Accordingly, the idler gear is driven to move away from the unidirectional gear, so that a holding force of the unidirectional gear and the idler gear with respect to the modeling material is reduced. In this way, the user may easily remove the modeling material to perform the maintenance operations such as replacement of the material, removal of jammed material, etc. Therefore, the invention further improves the ease of use and maintenance of the printing head module.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A printing head module, adapted to dispense a first modeling material and a second modeling material layer by layer on a base to form a three-dimensional (3-D) object, the printing head module comprising:
   a driving gear;
   a first unidirectional gear, engaged with a first side of the driving gear;
   a first idler gear, engaged with the first unidirectional gear;
   a second unidirectional gear, engaged with a second side of the driving gear opposite to the first side;
   a second idler gear, engaged with the second unidirectional gear; and
   a bi-directional motor, connected to the driving gear to selectively drive the driving gear to rotate along a first direction and a second direction to drive the first unidirectional gear and the second unidirectional gear to rotate simultaneously, wherein when the driving gear is driven to rotate along the first direction, only the second unidirectional gear drives the second idler gear to rotate to feed the second modeling material, when the driving gear is driven to rotate along the second direction, only the first idler gear is driven to rotate to feed the first modeling material.

2. The printing head module of claim 1, wherein the first unidirectional gear comprises a first active gear and a first passive gear, the first passive gear engages with the first idler gear, the first active gear comprises a ratchet having a plurality of teeth, each of the teeth has a curved side and a straight side, the first passive gear comprises at least a pawl, when the first active gear is driven to rotate along the second direction of the driving gear, at least one of the teeth of the ratchet is engaged with the pawl to drive the first passive gear to rotates with the first active gear to feed the first modeling material, when the first active gear is driven to rotate along the first direction of the driving gear, every tooth pushes up and slides under the pawl so the first passive gear does not rotate along with the first active gear.

3. The printing head module of claim 1, wherein the second unidirectional gear comprises a second active gear and a second passive gear, the second passive gear engages with the second idler gear, the second active gear comprises a ratchet having a plurality of teeth, each of the teeth has a curved side and a straight side, the second passive gear comprises at least a pawl, when the second active gear is driven to rotate along the first direction of the driving gear, at least one of the teeth of the ratchet is engaged with the pawl to drive the second passive gear to rotates with the second active gear to feed the second modeling material, when the second active gear is driven to rotate along the second direction of the driving gear, every tooth pushes up and slides under the pawl so the second passive gear does not rotate along with the second active gear.

4. The printing head module of claim 1, further comprising:
   a housing; and
   a first pivot arm, comprising a first pivot portion and a first extension portion, the first pivot portion connected to the first extension portion and pivoted to the housing, the first idler gear being disposed on the first pivot arm, wherein the first extension portion is adapted to bear an external force so the first pivot arm rotates relative to the housing to drive the first idler gear moving away from the first unidirectional gear, so as to reduce a nipping force applied to the first modeling material by the first unidirectional gear and the first idler gear.

5. The printing head module of claim 4, further comprising:
   a first elastic element, connected between the first pivot arm and the housing, when the first pivot am rotates relative to the housing, the first elastic element generating an elastic restoring force, so the first pivot arm is restored to its original position and the nipping force is recovered when the external force disappears.

6. The printing head module of claim 1, further comprising:
   a housing; and
   a second pivot arm, comprising a second pivot portion and a second extension portion, the second pivot portion connected to the second extension portion and pivoted to the housing, the second idler gear being disposed on the second pivot arm, wherein the second extension portion is adapted to bear an external force so the second pivot arm rotates relative to the housing to drive the second idler gear moving away from the second unidirectional gear, so as to reduce a nipping force applied to the second modeling material by the second unidirectional gear and the second idler gear.

7. The printing head module of claim 6, further comprising:
   a second elastic element, connected between the second pivot arm and the housing, when the second pivot am rotates relative to the housing, the second elastic element generating an elastic restoring force, so the second pivot arm is restored to its original position and the nipping force is recovered when the external force disappears.

8. The printing head module of claim 1, wherein the printing head module further comprises a printing head, and the printing head further comprises a first heating nozzle, the first modeling material is a hot-melt material, the first unidirectional gear and the first idler gear collectively transmit the first modeling material to the first heating nozzle, so that the first modeling material is melted and extruded from the first heating nozzle to be formed on the base.

9. The printing head module of claim 1, wherein the printing head further comprises a second heating nozzle, the second modeling material is a hot-melt material, the second unidirectional gear and the second idler gear collectively transmit the second modeling material to the second heating nozzle, so that the second modeling material is melted and extruded from the second heating nozzle to be formed on the base.

* * * * *